April 30, 1940.  M. F. PALMER  2,199,090
COMPRESSOR SYSTEM AND APPARATUS FOR ACTUATING SAME
Filed Nov. 9, 1936

INVENTOR
Martin Franklin Palmer.
BY
Arthur C. Brown
ATTORNEY

Patented Apr. 30, 1940

2,199,090

UNITED STATES PATENT OFFICE 2,199,090

COMPRESSOR SYSTEM AND APPARATUS FOR ACTUATING SAME

Martin Franklin Palmer, Wichita, Kans.

Application November 9, 1936, Serial No. 109,912

9 Claims. (Cl. 62—3)

This invention relates to compressor systems and an apparatus for actuating same and more particularly to a compressor system adapted to be mounted on an internal combustion engine, for example, that of an automobile, which compressor system is further adapted for receiving its actuating power from the fan belt of the engine or some other suitable revolving part thereof.

The principal object of the present invention is to provide an apparatus capable of deriving a variable and sufficient source of power from an internal combustion engine without resorting to any independent power plant for the purpose of operating the compressor system.

Other important objects of the present invention are to adapt the compressor system for use in air cooling, refrigerating and conditioning systems in connection with automobiles; to provide an apparatus which is capable of doing away with the necessity for heavy load generators and which delivers a great deal more power than that necessary to operate such heavy load generators; to provide an economically operated and easily installed apparatus for this purpose; to enhance the comfort of occupants of automobiles in hot climates and during hot seasons; and to provide a compressor system which is applicable to many forms of circulating medium compressing purposes wherein automatic compressor systems are desirable.

In accomplishing these and other objects of the present invention I have provided improved details of structure, the preferred form of which is illustrated in the accompanying drawing wherein.

Figure 1:
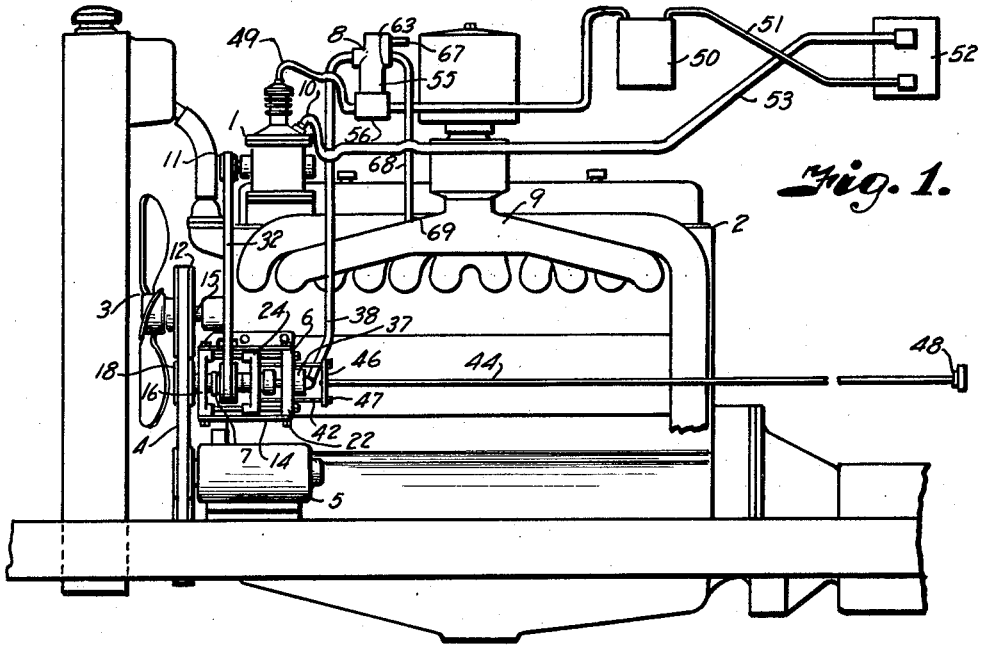
Fig. 1 is a side elevational view of an internal combustion engine mounted on a frame and having my improved compressor system and apparatus for actuating same applied thereto.

Referring more in detail to the drawing:

The invention generally consists of a compressor 1 suitably mounted on an internal combustion engine 2, the engine having a conventional fan 3 driven by the usual V-belt 4 which also drives a conventional generator 5, a power take-off 6 from the fan 3 being mounted on the engine and having a clutch unit 7 for effecting operation or cessation of operation of the power take-off for actuating or stopping actuation of the compressor. A valve 8 is also provided which has communication with an air intake member 5 of the manifold 9 of the engine and with the clutch unit for effecting disengagement of the clutch unit of the power take-off from driven engagement with the engine 2 in response to discharge pressures in the compressor system.

The compressor 1 is of conventional design and as above pointed out is preferably suitably mounted on the internal combustion engine 2. A drive shaft having a pulley 11 is provided on the compressor for operating the compressor from the fan pulley 12 and the belt connection 4 thereof through the power take-off 6, as now to be described.

Figures 2, 3:
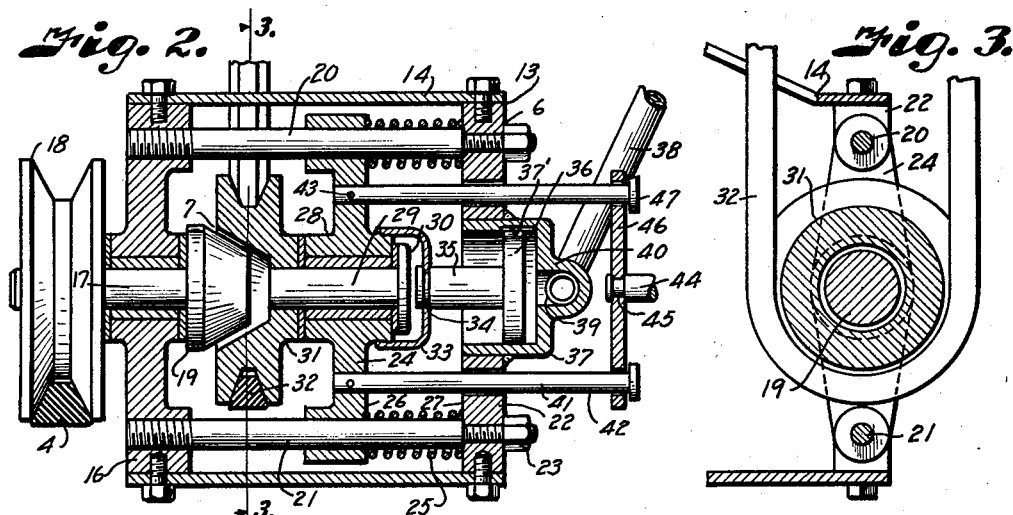
Fig. 2 is a vertical cross section through the power take-off and sliding clutch for actuating or stopping actuation of the compressor system.
Fig. 3 is a vertical cross section through the compressor clutch on the line 3—3, Fig. 2.
Figure 4:
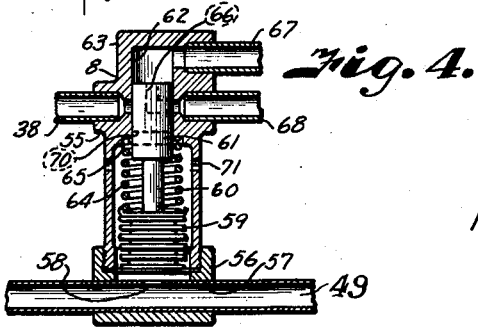
Fig. 4 is a vertical cross section through the valve unit for automatically rendering the compressor system operative or inoperative in response to compression in the pressure line.

The power take-off 6 is particularly illustrated in Fig. 2 and preferably consists of a frame 13 having suitable support 14, Fig. 1, on the internal combustion engine preferably adjacent the fan drive shaft 15. The frame 13 preferably consists of a casting 16 forming an end member for the frame having a central opening provided with a suitable bushing utilized as a bearing for supporting a driven shaft 17, on the outer end of which is mounted a V-pulley 18 which is adapted to be engaged by the belt 4 and is therefore positioned in alignment with the pulley 12 for rotating the shaft 17 and a clutch member 19 on the opposite end thereof. The casting 16 is further provided with bearing openings adjacent its ends for the passage of a pair of guide rods 20 and 21 on the opposite ends of which is mounted a casting 22 as by the fastening devices 23. A sliding member 24 of shorter length than the castings 16 and 22, and having openings adjacent its ends, is also slidably mounted on the guide rods 20 and 21. Coil springs 25 are sleeved on the rods 20 and 21 and preferably between the face 26 of the member 24 and the face 27 of the casting 22 for effecting engagement of the clutch members as later described. The member 24 is also provided with a bearing opening in a central portion 28 thereof for receiving a shaft 29 which has a head 30 on one end thereof for retaining it against movement out of the bearing in one direction and the opposite end of the shaft 29 is provided with a clutch member 31 adapted to be mated with the clutch member 19 when the member 24 is moved in one direction, as to the left in Fig. 2. The clutch member 31 is preferably in the form of a V-shaped pulley and is adapted to receive the lower run of a V-belt 32, the up-

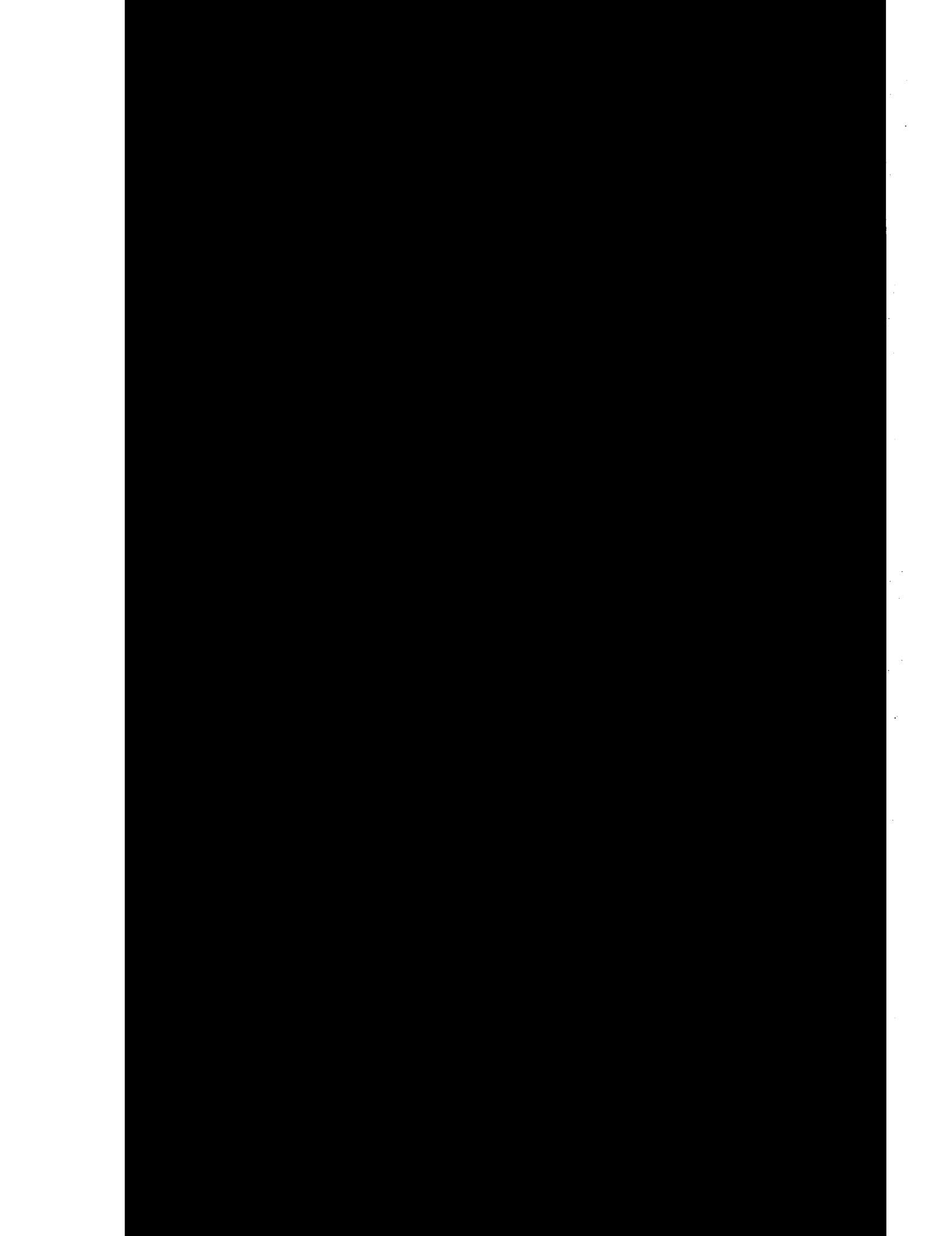

The piston opening 70 being so aligned with the vacuum lines 38 and 68, the manifold, in attempting to draw air for combustion of gases in the engine cylinders, draws air from the clutch piston sleeve 37 and effects retraction of the clutch piston into the sleeve. Such retraction of the piston draws the member 24 to the right, Fig. 2, for disengaging the clutch members 19 and 31 against tension of the springs 25 to thereby effect cessation of operation of the compressor 1. When the compression in the line 49 drops, the bellows collapse, the valve piston 61 drops, and the suction being relieved, the springs 25 are permitted to come into play to effect reengagement of the mating clutch members to again actuate the compressor.

When it is again desired to cool the automobile, for example, or condition the air thereof, when the previously conditioned air has been dissipated, the head 48 of the operating rod, which has been forced to the right in response to movement of the member 24 and slidable clutch unit under suction by the manifold, may also be forced to the left by manual pressure and the cycle of operation is repeated in the manner described. It is thus apparent that the compression actuating the refrigerating apparatus may be kept at a constant value thus insuring constant refrigeration of the automobile at any speed of travel thereof.

The principal advantages in an apparatus constructed as described are that an internal combustion engine is utilized as a source of power for operating the auxiliary compressor actuating apparatus. The compressor actuating apparatus is easily installed on a conventional internal combustion engine; is easily operated; and is efficient in such operation. Such an apparatus adds greatly to the comfort of occupants of an automobile to which the compressor system may be attached, when it is employed as a refrigerating system for the automobile. Further, the system and actuating apparatus may be used for a variety of purposes due to its relatively simple connection with a revolving part of an internal combustion engine.

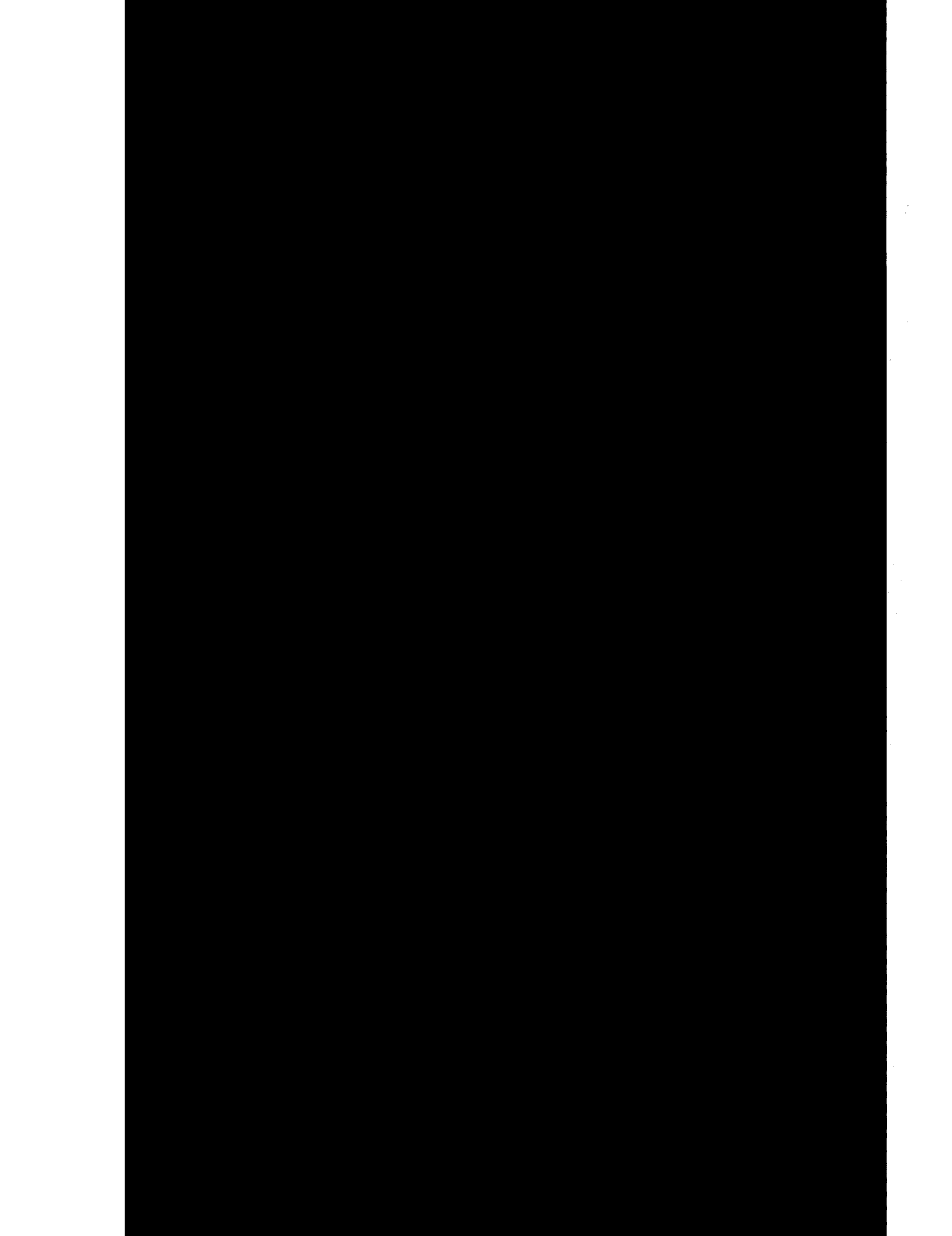

What I claim and desire to secure by Letters Patent is:

1. In combination with an internal combustion engine, a compressor system having a compression line, mechanical means connected with and operated by said engine and connected in said system for actuating same, a refrigerating apparatus connected in said line and actuated by said compressor system, means in said line responsive to pressures therein and acting on said mechanical means for disconnecting same from the engine to stop actuation of the compressor and refrigerating apparatus, and manually operated means for selectively disengaging and aiding in effecting connection between the compressor system actuating means and the engine.

2. In combination with an internal combustion engine having a manifold air intake line and a driven shaft, a power take-off mechanism including a clutch member connected with said shaft and driven thereby, a support for said power take-off mechanism, a slidable clutch unit on said support engageable with said clutch member, a compressor, means on said clutch unit connected with said compressor for actuating same in response to drive of said clutch member, a refrigerating system having circulatory communication with the compressor, and a valve communicating with the manifold air intake line and with the slidable clutch unit respectively, said valve being responsive to discharge pressures of said compressor for allowing communication between said slidable clutch unit and manifold air intake line to effect disengagement of said clutch member and unit.

3. In combination with an internal combustion engine having a manifold air intake line and a driven shaft, a power take-off mechanism including a clutch member connected with said shaft and driven thereby, a support for said power take-off mechanism, a slidable clutch unit on said support engageable with said clutch member, a compressor, means on said clutch unit connected with said compressor for actuating same in response to drive of said clutch member, a refrigerating system having circulatory communication with the compressor and adapted to be actuated thereby, a valve communicating with the manifold air intake line and with the slidable clutch unit respectively, said valve being responsive to discharge pressures of said compressor for allowing communication between said slidable clutch unit and manifold air intake line to effect disengagement of said clutch member and unit, and means on said slidable clutch unit normally effecting engagement of said clutch member and slidable clutch unit.

4. In combination with an internal combustion engine and a frame therefor, said engine having an air intake member, a rotatable shaft actuated by the engine having a pulley, a power take-off including a frame having a shaft rotatably mounted therein provided with a pulley and a clutch member at opposite ends thereof, means connecting the power take-off pulley with the engine shaft pulley, a slidable clutch unit mounted in said power take-off frame having a clutch member matingly engageable with said first-named clutch member, a piston sleeve in said power take-off frame, a piston in said sleeve connected with said sliding clutch unit, a compressor, means connecting the sliding clutch unit with said compressor for actuating same, a circulation system connected to and communicating with said compressor, a refrigerating apparatus connected in said circulation system and actuated by said compressor, and a valve respectively communicating with the air intake member of said engine and with said piston sleeve on the side of the piston opposite the clutch member of the sliding clutch unit, said valve being responsive to discharge pressure of said compressor for effecting communication between said air intake member and piston sleeve to create a suction for retracting the slidable clutch unit from engagement with said first-named clutch member.

5. In combination with an internal combustion engine and a frame therefor, said engine having a manifold air intake member, a rotatable shaft actuated by the engine having a pulley, a power take-off including a frame having a shaft rotatably mounted therein provided with a pulley and a clutch member at opposite ends thereof, means connecting the power take-off pulley with the engine shaft pulley, a slidable clutch unit mounted in said power take-off frame having a clutch member matingly engageable with said first-named clutch member, a piston sleeve in said power take-off frame, a piston in said sleeve connected with said sliding clutch unit, a compressor, means connecting the sliding clutch unit with said compressor for actuating same, a circulation system connected to and communicating with said compressor, a refrigerating apparatus